United States Patent
Ransom

(10) Patent No.: US 6,694,995 B1
(45) Date of Patent: Feb. 24, 2004

(54) RAPIDLY-OPENING HUNTING BLIND

(76) Inventor: Robert Mark Ransom, 8102 W. Coldwater Rd., Flushing, MI (US) 48433

( * ) Notice: Subject to any disclaimer, the term of this patent is extended or adjusted under 35 U.S.C. 154(b) by 0 days.

(21) Appl. No.: 10/029,219

(22) Filed: Dec. 28, 2001

(51) Int. Cl.⁷ ............................................. F04H 15/44
(52) U.S. Cl. ..................... 135/128; 135/143; 135/901; 43/1
(58) Field of Search .................. 135/901, 125, 135/128, 143; 43/1; 5/413 R, 414, 418

(56) References Cited

U.S. PATENT DOCUMENTS

| | | | |
|---|---|---|---|
| 3,799,608 A | * 3/1974 | Smutny et al. ................... | 43/1 |
| 4,068,674 A | * 1/1978 | Mitchell | |
| 4,106,145 A | 8/1978 | Gillen et al. | |
| 4,164,089 A | 8/1979 | George | |
| 4,483,090 A | * 11/1984 | Carper ............................. | 43/1 |
| 4,723,371 A | * 2/1988 | Williams ......................... | 43/1 |
| 4,738,045 A | * 4/1988 | Cardozo .......................... | 43/1 |
| 4,751,936 A | 6/1988 | Zibble et al. | |
| 4,757,832 A | * 7/1988 | Russell ....................... | 135/106 |
| 4,858,634 A | 8/1989 | McLeese | |
| 4,858,635 A | * 8/1989 | Eppenbach .................. | 135/104 |
| 5,075,999 A | * 12/1991 | Fredericks ........................ | 43/1 |
| 5,385,165 A | * 1/1995 | Hazinski et al. ............. | 135/126 |
| 5,477,875 A | 12/1995 | Daly, Jr. | |
| 5,647,159 A | 7/1997 | Latschaw | |
| 5,690,134 A | * 11/1997 | McCauley ................... | 135/133 |
| 5,762,085 A | 6/1998 | Punch | |
| 5,813,160 A | 9/1998 | Thoelke | |
| 5,816,279 A | 10/1998 | Zheng | |
| 5,822,906 A | 10/1998 | Ward | |
| D405,890 S | * 2/1999 | Latschaw ..................... | D25/16 |
| 5,941,264 A | * 8/1999 | Gregg ......................... | 135/116 |
| 6,016,823 A | 1/2000 | Hill | |

* cited by examiner

Primary Examiner—Robert Canfield
(74) Attorney, Agent, or Firm—Young & Basile, P.C.

(57) ABSTRACT

The specification discloses a rapidly-opening hunting blind comprising a fabric enclosure including an opening and moveable side panels at least partially defined by a resilient framework. The moveable side panels at least partially define a closure for the opening. The hunting blind has a closed condition, wherein free ends of the side panels are releasably connected to at least partially define a tent-like closure for the opening, and an opened condition, wherein the side panels extend radially outwardly and expose the opening. The resilient framework is biased towards the opened condition of the hunting blind such that when, in the closed condition of the hunting blind, the connected free ends of the side panels are released, the side panels tend spontaneously away from each other towards their radially extending configuration.

20 Claims, 4 Drawing Sheets

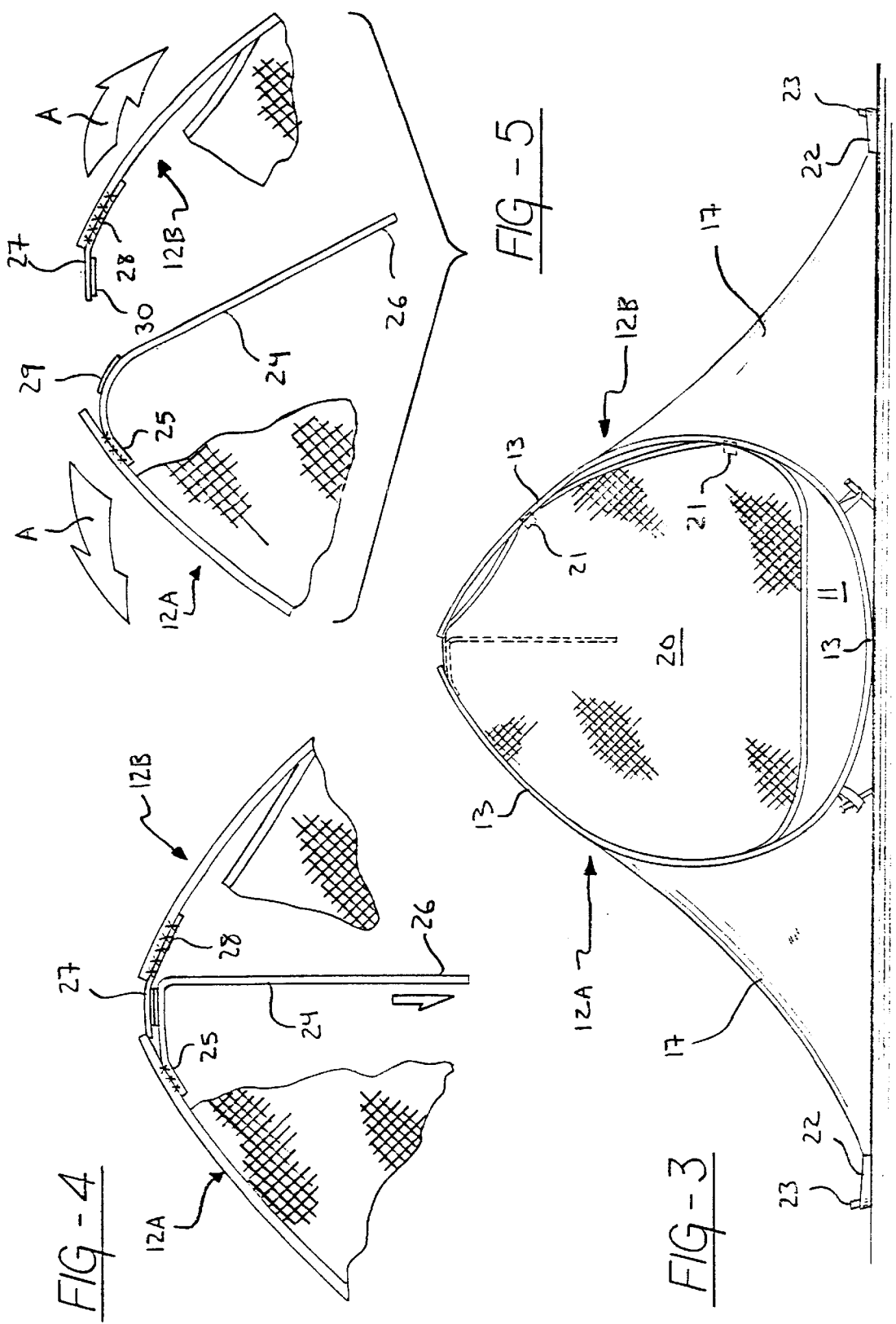

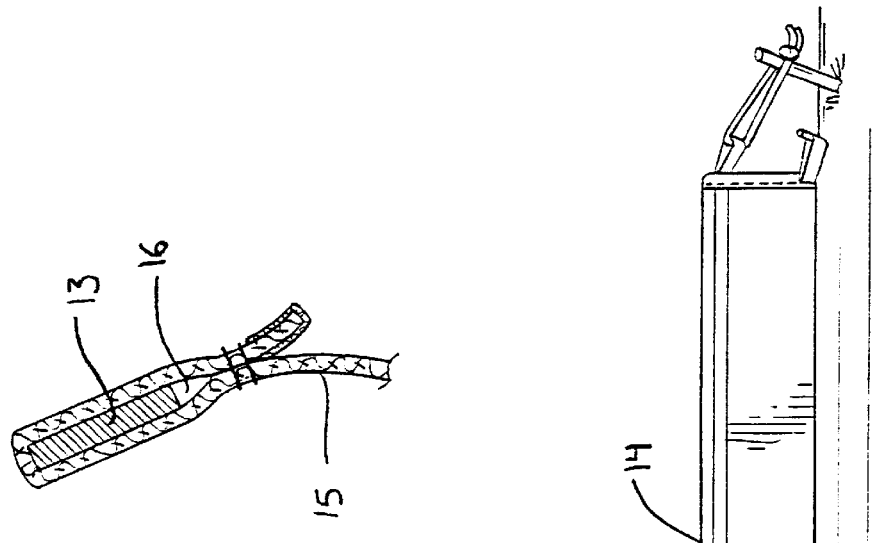
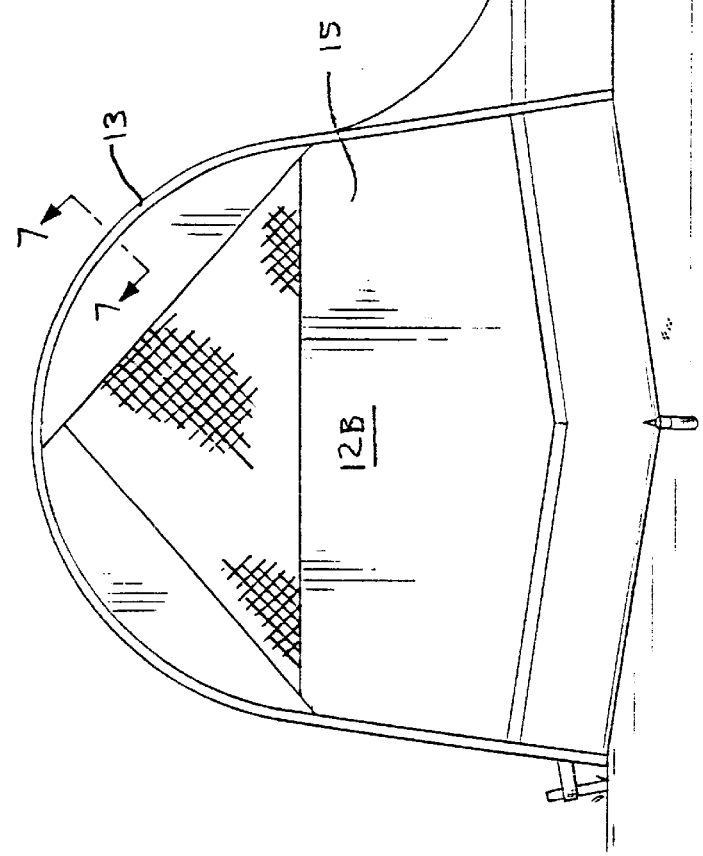

RAPIDLY-OPENING HUNTING BLIND

TECHNICAL FIELD

This invention generally relates to hunting blinds, such as may be used by sportsmen for hunting waterfowl, or by naturalists, photographers, etc., and in particular to such a hunting blind comprising a fabric enclosure having moveable side panels defined at least in part by a resilient framework that is biased towards an opened condition of the hunting blind, such that the side panels tend spontaneously away from each other and towards a radially extending configuration to expose the occupant of the hunting blind.

BACKGROUND OF THE INVENTION

Hunting blinds have for years been widely used among hunters, naturalists, photographers, and other outdoor enthusiasts. Essentially, such blinds comprise a personal shelter or enclosure—oftentimes camouflaged to blend in with the surrounding environment—in which one or more individuals may remain concealed from detection by game or other wildlife.

Significant requirements for hunting blinds are both portability and ease of deployment. It is oftentimes necessary for a hunter, naturalist, or other outdoor enthusiast to travel far from civilization in search of wildlife, and so the need for a relatively lightweight, easily man-portable blind is acute. And once on site, it is desirable that the blind be easy to set-up in as little time as possible.

In the past, hunting blinds have taken numerous forms, ranging from simple tent-like structures, exemplified in such publications as the AMERISTEP 2000 Hunting Accessories Catalog, to more elaborate—and less portable—structures, such as the pit blind of U.S. Pat. No. 5,822,906.

Tent-like structures have heretofore been made that are easily deployed by virtue of a construction about a loop of spring steel material. U.S. Pat. No. 3,960,161, issued to Norman, for instance, teaches a tent-like structure including a single, continuous loop of spring steel material biased to the shape of a tent. This framework of spring steel material is covered in a suitable fabric. Due to the resilient nature of the spring steel material, the tent of Norman may be readily collapsed into a more easily portable size while, upon unfolding, the frame springs into its biased shape to yield the fully deployed tent.

As exemplified in the disclosures of Ward, supra, as well as those of Latschaw, U.S. Pat. No. 5,647,159, Hill, U.S. Pat. No. 6,016,823, and Zibble et al., U.S. Pat. No. 4,751,936, it is known to provide hunting blinds with rapidly opening closures, so that a hunter may more effectively obtain a sporting shot at a point in time when the game animal is within range of the enclosure. Zibble et al., for instance, teach a portable field blind characterized by an elongated frame assembly. The blind includes a pivotal canopy hingedly connected to the frame assembly and adapted to open upwardly as a hunter moves from a laying to a seated posture. To facilitate rapid opening of the canopy, the device of Zibble et al. is taught to include an elongated spring connecting the canopy to the frame assembly. As the hunter exerts a slight upward force on the canopy during movement from a laying to a seated posture, the spring pulls the canopy rapidly open.

Unfortunately, numerous prior art hunting blinds, such as those described above are characterized by complex construction, a feature which makes their portability and easy deployment difficult, if not impracticable. Similarly, prior art attempts at hunting blinds with rapidly opening closures have been unsatisfactory for a variety of reasons. There consequently remains a need for a rapidly-opening hunting blind that is at once economical to manufacture, conveniently portable and easy to deploy, and which overcomes the drawbacks associated with the prior art devices.

SUMMARY OF THE DISCLOSURE

The specification describes a rapidly-opening hunting blind comprising a fabric enclosure including an opening and moveable side panels at least partially defined by a resilient framework, the moveable side panels at least partially defining a closure for the opening. The hunting blind has a closed condition, wherein free ends of the side panels are releasably connected to at least partially define a tent-like closure for the opening, and an opened condition, wherein the side panels extend radially outwardly and expose the opening. The resilient framework is biased towards the opened condition of the hunting blind such that when, in the closed condition of the hunting blind, the connected free ends of the side panels are released, the side panels tend spontaneously away from each other towards their radially extending configuration.

According to one feature of this invention, the resilient framework comprises a substantially continuous, generally elliptical framework. This framework may, according to another feature of the invention, be made of spring steel or coil steel, though other materials of comparable character may also be substituted. Per a further feature, the resilient framework is foldable so that the hunting blind is collapsible to a storage configuration.

According to still another feature, the side panels include complimentary fastening elements by which the side panels are releasably connected in the closed condition of the blind. These complimentary fastening elements may, per one feature of this invention, comprise hook and loop type fasteners.

Per yet another inventive feature, one of the side panels is provided with means for rapidly releasing the connected side panels in the closed condition of the blind.

According to still another feature of this invention, the fabric enclosure further includes a bag-like portion adapted to receive the lower body of one or more occupants.

BRIEF DESCRIPTION OF THE DRAWINGS

The description herein makes reference to the accompanying drawings, wherein like numerals refer to like or corresponding parts throughout the several views, and wherein:

FIG. 3 is a rear elevational view of the hunting blind of FIG. 1;

FIG. 4 and 5 are detailed views of means for releasably connecting the side panels of the hunting blind in the closed condition thereof;

FIG. 6 is a lateral elevational view of the hunting blind of FIG. 1;

FIG. 7 is a detailed cross-section of the hunting blind of FIG. 6, illustrating the placement of the framework within the fabric covering;

DESCRIPTION OF THE ILLUSTRATED EMBODIMENT

Figure 1:
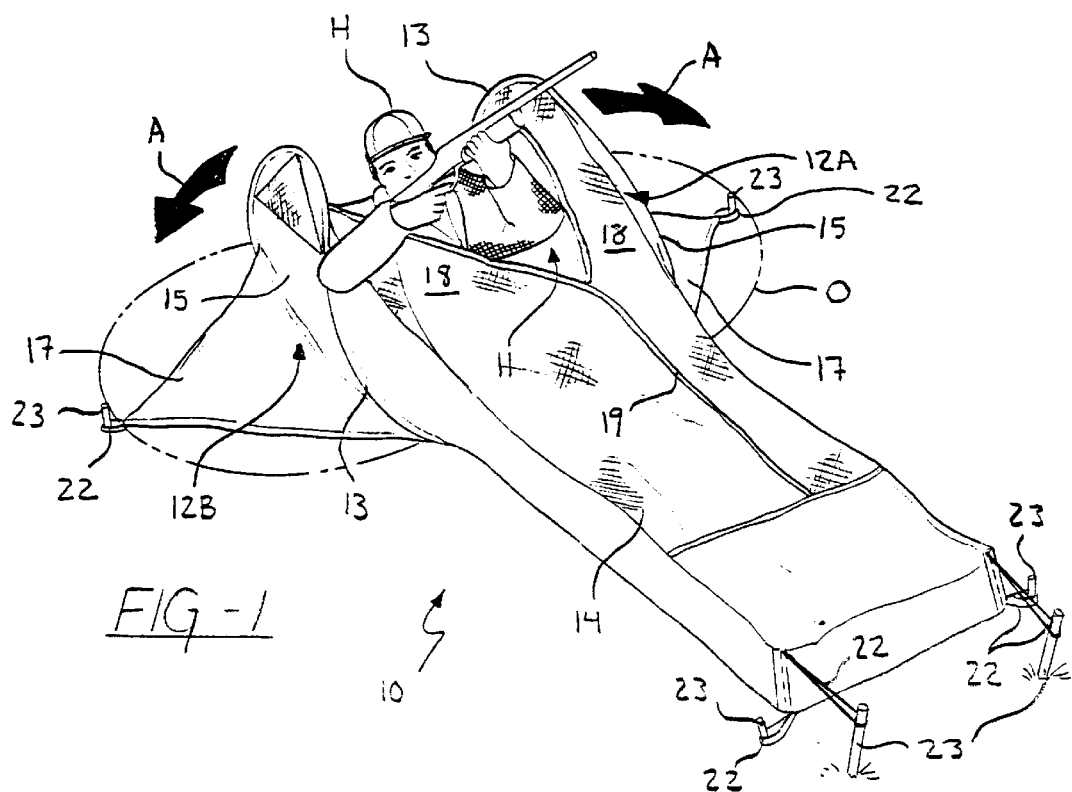
FIG. 1 is a perspective view of the hunting blind of the present invention, shown in the opened condition thereof.

Referring now to the drawings in detail, and to FIGS. 1, 2, 3 and 6 more particularly, the hunting blind 10 of the present invention will be seen to generally comprise a fabric enclosure for one or more occupants, for instance a hunter H as illustrated in FIG. 1, the enclosure further including an ingress/egress/shooting opening 11 and moveable side panels 12A and 12B at least partially defined by a resilient framework 13, the moveable side panels 12A and 12B at least partially defining a closure for the opening 11.

Figure 2:
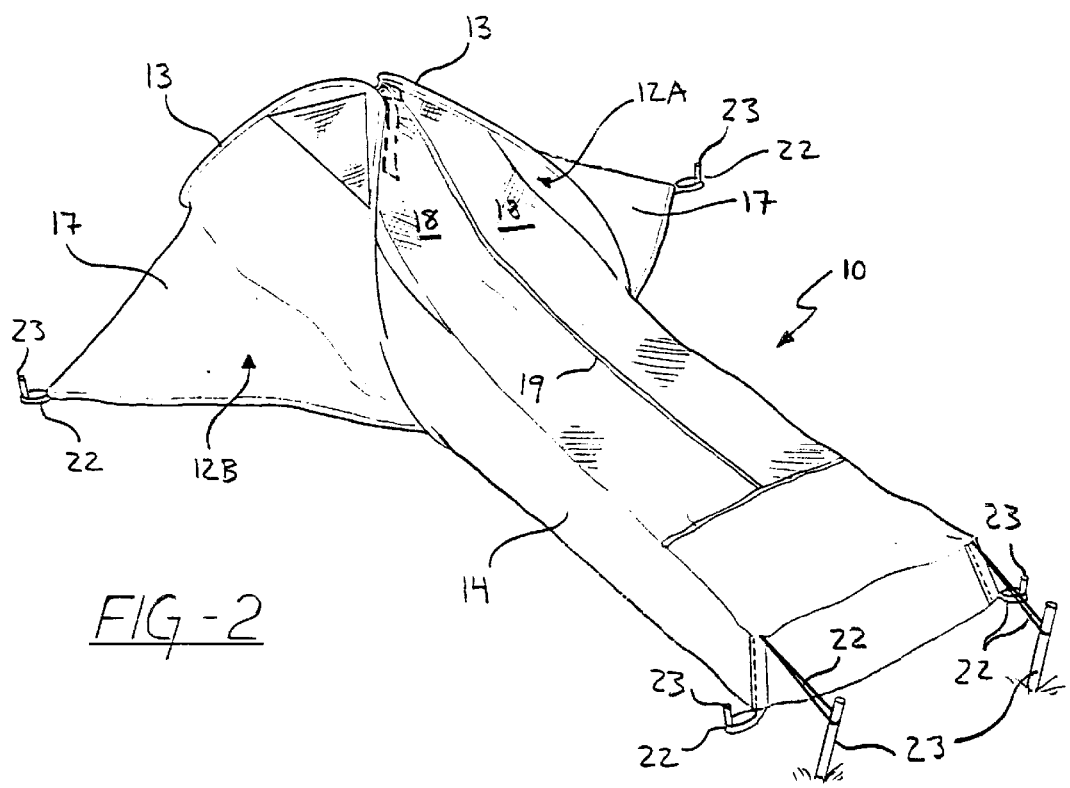
FIG. 2 is a perspective view of the hunting blind of FIG. 1, shown in the closed condition thereof.

Referring particularly to FIGS. 1 and 2 the hunting blind 10 has a closed condition, wherein free ends of the side panels 12A and 12B are brought together and releasably connected to at least partially define a tent-like closure for the opening 11 (best shown in FIG. 2), and an opened condition, wherein the side panels 12A and 12B extend radially outwardly and expose the opening 11, as shown best by the dashed lines O in FIG. 1.

The resilient framework 13 is biased towards the opened condition of the blind such that when, in the closed condition of the hunting blind, the connected free ends of the side panels 12A and 12B are released, the side panels 12A and 12B tend spontaneously away from each other towards their radially extending configuration O.

Still referring to FIGS. 1–4, the hunting blind 10 of the illustrated embodiment is characterized by a first portion including the opening 11 and the at least two moveable side panels 12A and 12B, and a second portion 14 extending from and communicating with the first portion, the second portion comprising a sleeping-bag like fabric structure adapted to receive the lower body of one or more occupants. According to this configuration, the legs of the one or more occupants are disposed in the bag-like second portion 14, while the upper body or bodies of the one or more occupants are disposed in the first portion of the enclosure proximate the opening 11. Of course, those of skill in the art will appreciate, with reference to the remainder of this specification, that the bag-like second portion 14 is not necessary to the broader aspects of the present invention, and a hunting blind according to this invention may comprise, by way of example, larger side panels 12A and 12B sufficient to define a tent-like enclosure suitable for one or more occupants. And while two side panels 12A and 12B are shown in the embodiment described herein, it is also contemplated that a hunting blind with three or even more side panels may be fashioned consistent with the present invention. For instance, it is contemplated by the present disclosure that a hunting blind in accordance with this invention may comprise four or more moveable side panels arranged such that the lateral edges of adjacent side panels are abutting in the closed condition of the hunting blind to define a multiple-sided, pyramid-like structure suitably commodious to accommodate one or more occupants.

Referring now to FIGS. 2 and 3, it will best be seen that the side panels 12A and 12B are each defined by a fabric covering 15 provided over the framework 13, the fabric covering 15 assuming the overall shape of the associated framework 13. As best shown in FIG. 7, the framework 13 is disposed in a continuous sleeve or channel 16 formed in the fabric covering 15 of each side panel 12A and 12B. The fabric covering 15 of the side panels 12A and 12B will be seen to include outwardly flared flaps 17 mated at their lowermost edges to a bottom fabric or plastic surface (not shown) of the enclosure. According to this configuration, it will be appreciated that first portion of the hunting blind 10 defines a commodious, tent-like enclosure when the hunting blind is in the closed condition thereof (FIG. 2).

Still referring to FIGS. 1 and 2, fabric flaps 18 associated with each of the side panels 12A and 12B are provided to further define a closure for the opening 11. Each flap 18 extends continuously from its associated side panel 12A or 12B to form part of the bag-like second portion 15, the flaps 18 being joined at a common seam 19 part-way along their adjacent edges. In the closed configuration of the hunting blind 10, best shown in FIG. 2, it will be seen that the adjacent, un-joined edges of the flaps 19 overlap to form part of the closure for the opening 11. In this closed configuration of the hunting blind 10, any known means, for instance hook and loop type fasteners (not shown), such as VELCRO®, may be employed to removably secure the flaps 19 together along the adjacent, un-joined edges thereof.

Referring now to FIG. 3, the rear of the hunting blind 10 will also be seen to include a fabric flap 20 forming a part of the closure for the opening 11. The flap 20 is fixedly secured to one of the side panels 12A and releasably connectable to the opposite side panel 12B, and is further adapted to substantially cover the generally oval-shaped opening defined by the interconnected side panels 12A and 12B in the closed condition of the hunting blind (best shown in FIG. 2). The flap 20 may comprise any suitable material, such as the illustrated mesh or net-like fabric. As indicated, a releasable securement between the flap 20 and the side panel 12B is preferably provided, and may for instance take the form of hook and loop type fasteners 21, such as VELCRO®, complementary halves of such material being provided on each of the flap 20 and the side panel 12B in known fashion.

The hunting blind 10 of this invention is suited to formation from any of numerous commercially available materials, including one or more suitable natural and/or synthetic fabric materials, for instance nylon, cotton, etc., these materials being selected according to user desire. As indicated, the bottom of the enclosure (not shown), may comprise a plastic material especially well-suited to repel moisture, or a desired fabric material, both such configurations being known to those of skill in the art as being employed in the fabrication of conventional tent structures. In the hunting blind 10 of the illustrated embodiment, the fabric materials include both breathable, mesh or net-like sections to provide air circulation through the blind 10, as well as to permit the occupant or occupants a degree of visibility therethrough, and opaque fabric sections of water-repellent material. To provide for the concealment of the hunting blind 10 in the surrounding environment, particularly for employment of the hunting blind for sport shooting and like endeavors, the several fabric sections thereof may be provided (by printing or other means known to those of skill in the art) with any desired camouflage pattern or other indicia tending to reflect the surrounding flora and/or fauna.

Referring again to FIGS. 1–3, the hunting blind 10 is shown to include conventional means for securement to a support surface, such as the ground, etc., these means comprising no part of the invention but instead being illustrated to more fully describe the operational employment of the invention. The illustrated means comprise tie downs 22, each such tie down adapted to receive therethrough a stake 23, peg, or the like. The tie downs 22 are, as depicted, provided at locations about the perimeter of the hunting blind 10 in positions adapted to firmly secure the hunting blind 10 to the ground or other support surface. Two of the tie downs 22 are provided at the apex of the laterally extending flaps 17, these flaps providing increased stability for the hunting blind 10 when secured to a suitable support surface. Tie downs and like means are well-known to those of skill in the art as comparable to those employed in securing tents and like structures, and it will be appreciated that these and similar means may be substituted, as desired, for the tie downs described particularly herein.

The hunting blind 10 is characterized by both an opened condition (best shown in FIG. 1), wherein the side panels 12A and 12B extend radially outward and expose the opening 11, and a closed condition (best shown in FIG. 2), wherein free ends of the side panels 12A and 12B are urged upwardly and inwardly towards each other against the bias of the framework 13, and the free ends of the side panels 12A and 12B are releasably connected to form a tent-like closure for the opening 11. By virtue of the bias of the framework 13 towards the opened condition of FIG. 1, it will be appreciated that urging the side panels 12A and 12B towards each other against the bias of the framework 13 creates a spring tension such that when, in the closed condition of the hunting blind 10 (FIG. 2), the connected free ends of the side panels 12A and 12B are released, the side panels 12A and 12B move rapidly and spontaneously away from each other (in the direction of arrows A) and towards the opened condition of the hunting blind (FIG. 1).

Figure 8:
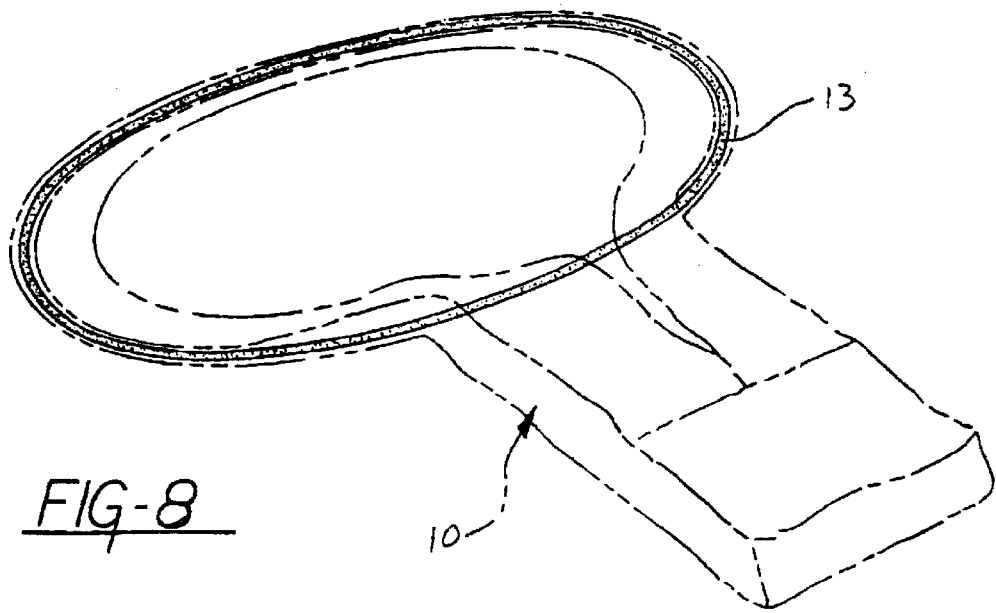
FIG. 8 shows the framework in the biased configuration thereof, the remainder of the hunting blind being shown in phantom lines.
Figure 9:
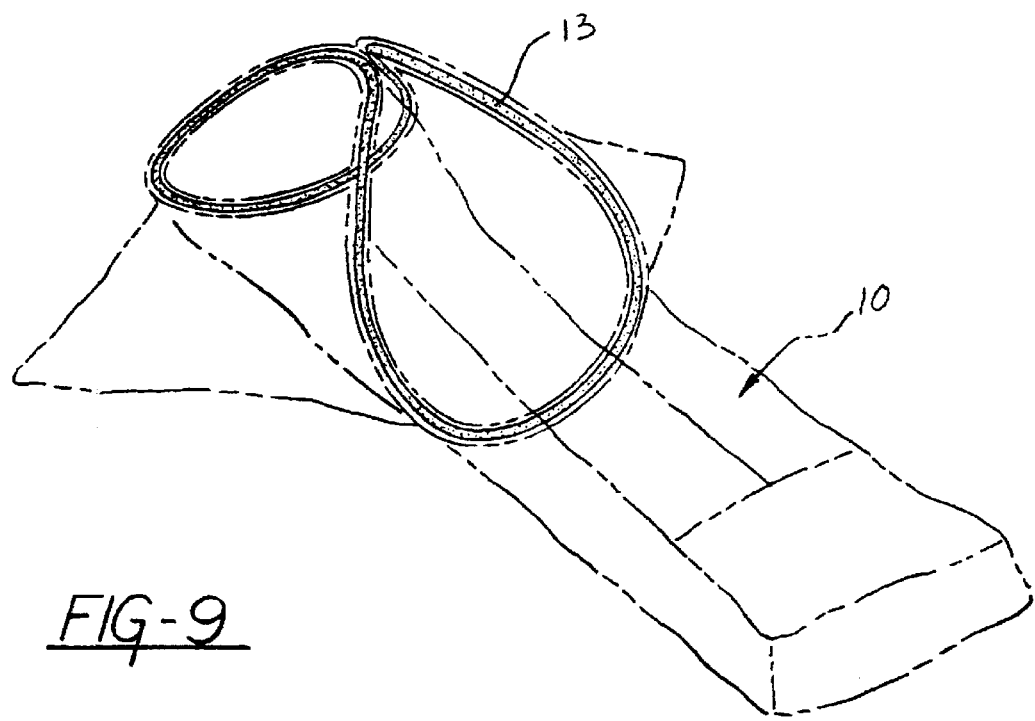
FIG. 9 shows the framework of FIG. 8 in the closed condition of the hunting blind (shown in phantom lines).

Referring now to FIGS. 8 and 9, the framework 13 is preferably formed of a spring-steel material, such as is known for use in constructing self-erecting structures of the type described in U.S. Pat. No. 4,858,634, issued to McLeese, the disclosure of which patent is incorporated herein by reference in its entirety. This spring steel material is characterized by "shape memory," and so is amenable to temporary distortions in shape without permanent deformation of the original shape. Such material has the virtue of imparting the requisite spring force to the side panels 12A and 12B when the side panels are bent towards each other to form the tent-like closure shown best in FIGS. 2 and 3, as well as the added advantage of being amenable to folding, so that the entire hunting blind 10 can be collapsed to form a compact, easily portable package only a fraction of its fully deployed size. Other known materials of similar character may also be substituted for spring steel, including, without limitation, coilable steel, fiberglass, or other such suitably resilient metals or polymers.

Still referring to FIGS. 8 and 9, the resilient framework 13 of the illustrated embodiment comprises a substantially continuous framework formed, as stated, from spring steel or like material. This framework 13 is characterized by, and naturally biased towards, a generally planar, elliptical shape (FIG. 8) characteristic of the opened condition of the hunting blind 10. In the closed configuration of the hunting blind 10, this continuous framework is bent to define the saddle-like shape best shown in FIG. 9 (wherein the fabric of the hunting blind 10 is represented in phantom lines) Referring also to FIGS. 3, 6 and 7, the continuous framework 13 is disposed in a continuous sleeve or channel 16 defined in and between the fabric of the side panels 12A and 12B.

It will, however, be appreciated that the framework 13 need not be substantially continuous as described, and that, alternatively, the framework 13 may, for example, comprise separate framework elements, one for each of the at least two side panels 12A and 12B and secured to a rigid base or other intermediate structure suitable to secure these framework elements at their lower ends and so to provide a fixed position against which their free ends may move between the closed and opened conditions of the hunting blind in the manner described.

As the spring steel construction of the framework 13 biases the side panels 12A and 12B towards the opened condition of the hunting blind 10, means are provided to selectively retain the side panels 12A and 12B in interconnected relation to form the tent-like closure shown in FIGS. 2 and 3. Referring specifically to FIGS. 4 and 5, these means will be seen to comprise, in the illustrated embodiment, a releasably engageable fastening mechanism, and more particularly, an easily operable, quick-release mechanism whereby the occupant or occupants of the hunting blind 10 may effect rapid separation of the side panels 12A and 12B. As shown, one of the side panels 12A is provided with a first length of material 24, such as a strip or chord of fabric, rope, etc. having a first end 25 thereof secured to the side panel 12A proximate its free end; the unsecured end 26 of the first length of material 24 freely depending from this point of securement. The other of the side panels 12B is provided with a second length of material 27, which material may also comprise a strip of fabric, rope, etc. The first end 28 of the second length of material 27 is secured to the side panel 12B proximate its free end, and the remainder of the second length of material 27 freely depends from this point of securement. As depicted, the second length of material 27 is substantially shorter than the first length of material 24. Each of the first and second lengths of material 24, 27 is provided with complimentary portions 29, 30 of a hook and loop type fastener, such as VELCRO®, these complimentary portions being selectively engageable when the first and second lengths of material 24, 27 are arranged in lapped relation, such as shown in FIG. 4. Of course, other fastening means may be employed, including buttons and the like, subject to the necessity that such fastening means be suitably strong to withstand unwanted separation by the biasing force of the framework 13.

In operation, the hunting blind 10 is deployed and secured to the ground or other suitable support surface in the manner shown in FIGS. 1–3 and 6, using stakes 23 and the tie downs 22 provided on the blind 10. Once deployed and secured, the hunter H (or other occupant or occupants) enters the enclosure and conceals himself therein by grasping the first and second material lengths 24, 27 and pulling them towards each other so as to urge the side panels 12A and 12B inwardly until the complimentary portions 29, 30 of the hook and loop type fastener (or other suitable elements) provided on the respective lengths of material 24, 27 can be brought into interconnected relation. The hunter H is then able to lie concealed within the enclosure, viewing the surrounding environment outside the enclosure as necessary through the mesh fabric sections of the blind 10. At such time as the hunter desires to open the blind 10, he need only pull on the first material length 24 with sufficient force to separate the complimentary portions of the hook and loop type fastener, following which separation the side panels 12A and 12B move rapidly apart in the directions of arrows A under the biasing force of the framework 13, tending spontaneously away from each other towards their radially extending configuration and the biased configuration of the framework 13, as shown in FIG. 8 and in phantom lines O in FIG. 1.

Of course, it will be appreciated that the foregoing is merely illustrative of the present invention, and that additional modifications and improvements thereto, apparent to those of skill in the art, are possible without departing from the spirit and broader aspects of this invention as set forth in the appended claims.

The invention in which an exclusive property or privilege is claimed is defined as follows:

1. A rapidly-opening hunting blind, comprising:

a fabric-covered, substantially planar resilient framework defining a single closed loop;

the hunting blind having a closed condition, wherein the framework is bent from the substantially planar configuration thereof and opposite portions of the framework are releasably interconnected to define a tent-like structure dimensioned to at least partially conceal one or more occupants, and an opened condition, wherein the resilient framework is in the substantially planar configuration thereof; and wherein further the resilient framework is biased towards the opened condition of the hunting blind such that when, in the closed condition of the hunting blind, the interconnected opposite portions of the framework are released, the framework tends spontaneously to the substantially planar configuration thereof.

2. The rapidly-opening hunting blind of claim 1, wherein the resilient framework comprises a substantially continuous, generally elliptical framework.

3. The rapidly-opening hunting blind of claim 2, wherein the resilient framework is made of spring steel.

4. The rapidly-opening hunting blind of claim 2, wherein the resilient framework is made of coil steel.

5. The rapidly-opening hunting blind of claim 2, wherein the resilient framework is made of fiberglass.

6. The rapidly-opening hunting blind of claim 1, further comprising complimentary fastening elements by which the opposite portions of the framework are releasably interconnected in the closed condition of the blind.

7. The rapidly-opening hunting blind of claim 6, wherein one of the opposite portions of the framework is provided with means for rapidly releasing the interconnected opposite portions of the framework in the closed condition of the blind.

8. The rapidly-opening hunting blind of claim 7, wherein the complimentary fastening elements comprise hook and loop type fasteners.

9. The rapidly-opening hunting blind of claim 1, further including a frameless bag-like portion extending away from the framework, the bag-like portion adapted to receive the lower body of one or more occupants.

10. A rapidly-opening hunting blind, comprising:

a fabric-covered, resilient framework defining a single closed loop having a substantially planar configuration, the fabric-covered framework at least partially defining a pair of side panels;

wherein the hunting blind is characterized by a closed condition, in which the framework is bent upwardly from the substantially planar configuration and opposite portions thereof are releasably connected so that the side panels form a tent-like enclosure, and an opened condition, in which the resilient framework is in the substantially planar configuration thereof; and wherein further the resilient framework is biased towards the substantially planar configuration thereof such that when, in the closed condition of the hunting blind, the connected opposite portions of the framework are released, the side panels tend spontaneously away from each other.

11. The rapidly-opening hunting blind of claim 10, wherein the resilient framework comprises a substantially continuous, generally elliptical framework.

12. The rapidly-opening hunting blind of claim 11, wherein the resilient framework is made of spring steel.

13. The rapidly-opening hunting blind of claim 11, wherein the resilient framework is made of coil steel.

14. The rapidly-opening hunting blind of claim 10, further comprising complimentary fastening elements by which the opposite portions of the resilient framework are releasably connected in the closed condition of the blind.

15. The rapidly-opening hunting blind of claim 14, further comprising means for rapidly releasing the connected opposite portions of the framework in the closed condition of the hunting blind.

16. The rapidly-opening hunting blind of claim 15, wherein the complimentary fastening elements comprise hook and loop type fasteners.

17. The rapidly-opening hunting blind of claim 10, wherein the tent-like enclosure formed by the side panels in the closed condition of the hunting blind is dimensioned to conceal the upper body of one or more occupants, and wherein further the hunting blind comprises a frameless bag-like portion extending away from the framework, the bag-like portion adapted to receive the lower body of one or more occupants.

18. The rapidly-opening hunting blind of claim 10, wherein the resilient framework is foldable so that the hunting blind is collapsible to a storage configuration.

19. A rapidly-opening hunting blind, comprising:

a resilient framework defining a single closed loop having as its biased shape a generally planar configuration, and a fabric covering provided over the framework;

the hunting blind being characterized by an erected condition, wherein opposite portions of the framework are urged upwardly against the bias of the framework and releasably connected to define, in combination with the fabric covering, a tent-like enclosure; and wherein when, in the erected condition of the hunting blind, the connected opposite portions of the framework are released, the framework tends spontaneously towards the generally planar configuration thereof.

20. The rapidly-opening hunting blind of claim 19, further including a frameless bag-like portion adapted to receive the lower body of one or more occupants.

* * * * *